United States Patent [19]
Li et al.

[11] Patent Number: 5,754,604
[45] Date of Patent: May 19, 1998

[54] SYNCHRONIZATION TO PSEUDO RANDOM NUMBER SEQUENCE WITH SIGN AMBIGUITY IN COMMUNICATIONS SYSTEMS

[75] Inventors: Gang Li, Nepean; Rui Wang, Ottawa, both of Canada; Iouri Trofimov, Moskva, Russian Federation; Alexandre Chloma; Mikhail Bakouline, both of Moskovskaja oblast, Russian Federation; Vitali Kreindeline, Moskva, Russian Federation

[73] Assignee: Northern Telecom Limited, Montreal, Canada

[21] Appl. No.: 689,040

[22] Filed: Jul. 30, 1996

Related U.S. Application Data

[60] Provisional application No. 60/001,881 Aug. 3, 1995.
[51] Int. Cl.$^6$ .................................................. H04L 7/00
[52] U.S. Cl. ........................ 375/367; 375/208; 370/515
[58] Field of Search ...................... 375/367, 208, 375/354; 370/514, 515

[56] References Cited

U.S. PATENT DOCUMENTS

| 5,163,070 | 11/1992 | Bielby et al. | 375/367 |
| 5,181,225 | 1/1993 | Nesser et al. | 375/200 |
| 5,440,597 | 8/1995 | Chung et al. | 375/200 |

OTHER PUBLICATIONS

R. B. Ward et al., "Acquisition of Pseudonoise Signals by Recursion-Aided Sequential Estimation", IEEE Transactions on Communications, vol. COM-25, No. 8, Aug. (1977), pp. 784-794.

R. B. Ward, "Acquisition of Pseudonoise Signals by Sequential Estimation", IEEE Transactions on Communications, vol. COM-13, No. 4, Dec. (1965), pp. 475-483.
Bakulin et al., "An Algorithm for Filtering Linear Recurrent Sequences from a Mixture with Noise" Telecommunications and Radio Engineering, vol. 48, No. 9, May (1995), pp. 119-125.
Bakulin et al., Radiotekhnika, vol. 6, Sep. (1994), pp. 68-74.

*Primary Examiner*—Temesghen Ghebretinsae
*Attorney, Agent, or Firm*—Foley & Lardner

[57] ABSTRACT

A method is disclosed for synchronizing, in the presence of sign ambiguity, to a pseudo random maximal length sequence having a characteristic polynomial of order k with a coefficients vector A given by:

$$A=[1\ a_1\ a_2\ \ldots\ a_{k-1}\ 1]$$

where each of the coefficients $a_1$ to $a_{k-1}$ is 1 for an intermediate tap location and otherwise is 0. A received symbol sequence is supplied to and shifted through a K=k+1 stage shift register with P intermediate taps in positions determined by a coefficients vector $A_{in}$ given by:

$$A_{in}=[1\ \bar{a}_1\ (a_1 \oplus a_2)\ (a_2 \oplus a_3)\ \ldots\ (a_{k-2} \oplus a_{k-1})\ \bar{a}_{k-1}\ 1]$$

where $\bar{a}_1$ and $\bar{a}_{k-1}$ are the inverse of $a_1$ and $a_{k-1}$ respectively and $\oplus$ denotes a modulo-2 sum, whereby the shift register has P intermediate taps where P is a positive integer less than K. A respective correlation signal is recursively added at an input for the received symbol sequence and at each intermediate tap. Each correlation signal is produced by correlating the P+1 signals from said input, intermediate taps, and output other than the signal to which the respective correlation signal is added. The invention is particularly applicable to pilot synchronization in CDMA terminals.

14 Claims, 3 Drawing Sheets

SYNCHRONIZATION TO PSEUDO RANDOM NUMBER SEQUENCE WITH SIGN AMBIGUITY IN COMMUNICATIONS SYSTEMS

This application claims the benefit of United States Provisional Application No. 60/001,881 filed Aug. 3, 1995, the entire contents and disclosure of which are hereby incorporated herein by reference.

CROSS-REFERENCE TO RELATED APPLICATION

Reference is directed to U.S. application Ser. No. 08/688, 670 filed Jul. 29, 1996 in the names of Philip H. Thomas et al. and entitled "Pseudo Random Number Sequence Synchronization In Communications Systems" (claiming the benefit of United States Provisional Application No. 60/001, 885 filed Aug. 3, 1995), the entire contents and disclosure of which are hereby incorporated herein by reference. For brevity and convenience, this is referred to below as Reference A.

BACKGROUND OF THE INVENTION

This invention relates to synchronization in communications systems, for example spread spectrum cellular systems or other wireless digital communications systems, and is particularly concerned with synchronization in such systems using long pseudo random number sequences.

In spread spectrum communications systems, fast synchronization to a long pseudo random or pseudo noise sequence, referred to for brevity as a PN sequence, is of importance. It is known to handle PN sequence synchronization by using auto-correlation characteristics of the PN sequence. One type of PN sequence widely used in practice is a maximal length sequence, referred to as an m-sequence, which is generated by a linear feedback shift register. If the shift register has k stages, then the length of the m-sequence is $2^k-1$ symbols.

Long PN sequences are often employed in spread spectrum communications systems, but increase the time required to establish synchronization. To reduce this time it is known to use recurrent searching synchronization methods, with the advantage that synchronization can be achieved based on only a small part of a very long sequence when the SNR (signal-to-noise ratio) is not low. However, these methods have not been effective when the SNR is low, for example less than 0 dB, because only a small part of the sequence is used for synchronization. Low SNR is common in spread spectrum communications systems.

Reference A provides an improved method of synchronizing to a PN sequence, which can facilitate fast synchronization to a long PN sequence even at low SNR and when the PN sequence is not an m-sequence. However, the method may not work properly when the received symbol sequence has sign ambiguity, e.g. contains sign inversions. A sign inversion can arise from canter phase ambiguity, in which case it is constant throughout the entire received symbol sequence. Sign inversions can also occur in a relatively random manner due to modulation of the sequence by data symbols in normal operating states of the communications system.

An object of this invention is to provide an improved method for achieving synchronization to a PN sequence in the presence of sign ambiguity.

SUMMARY OF THE INVENTION

The invention provides a method of synchronizing to a PN (pseudo random) sequence which can be generated by a linear feedback shift register having k stages and p intermediate taps, where k and p are positive integers and k>p, the sequence being a maximal-length sequence comprising $2^k-1$ symbols and having a characteristic polynomial of order k with a coefficients vector A given by:

$$A=[1\ a_1\ a_2\ \ldots\ a_{k-1}\ 1]$$

where the coefficients $a_1$ to $a_{k-1}$ are each 1 for an intermediate tap location and otherwise are 0, comprising the steps of: supplying a received symbol sequence having sign ambiguity to an input of, and shifting the sequence through, a shift register having K=k+1 stages with an intermediate tap at each location defined by a 1, between first and last 1s, in a coefficients vector $A_{in}$ given by:

$$A_{in}=[1\ \bar{a}_1\ (a_1 \oplus a_2)\ (a_2 \oplus a_3)\ \ldots\ (a_{k-2} \oplus a_{k-1})\ \bar{a}_{k-1}\ 1]$$

where $\bar{a}_1$ and $\bar{a}_{k-1}$ are the inverse of $a_1$ and $a_{k-1}$ respectively and $\oplus$ denotes a modulo-2 sum, whereby the shift register has P intermediate taps where P is a positive integer less than K; recursively adding a respective correlation signal at the input and at each intermediate tap of the shift register; and producing each correlation signal by correlating the P+1 signals from said input, intermediate taps, and output of the shift register other than the signal to which the respective correlation signal is added.

Viewed alternatively, the method comprises shifting the received symbol sequence having sign ambiguity through a shift register having K=k+1 stages with an intermediate tap at each location defined by a 1, between first and last 1s, in a coefficients vector $A_{in}$ given by:

$$A_{in}=[1\ \bar{a}_1\ (a_1 \oplus a_2)\ (a_2 \oplus a_3)\ \ldots\ (a_{k-2} \oplus a_{k-1})\ \bar{a}_{k-1}\ 1]$$

where $\bar{a}_1$ and $\bar{a}_{k-1}$ are the inverse of $a_1$ and $a_{k-1}$ respectively and $\oplus$ denotes a modulo-2 sum, whereby the shift register has P intermediate taps where P is a positive integer less than K; at the input and at each intermediate tap of the shift register, recursively adding to the shift register contents a respective correlation signal; producing the correlation signal for adding at the input of the shift register by correlating the P+1 signals from the P intermediate taps and the output of the shift register; and producing the correlation signal for adding at each of the P intermediate taps by correlating the P+1 signals from the input, output, and P-1 other intermediate taps of the shift register.

Conveniently the step of producing each correlation signal comprises producing a product of the signs of said P+1 signals and of a minimum absolute value of said P+1 signals. The step of supplying the received symbol sequence to the input of the shift register can comprise the step of modifying the received symbol sequence in accordance with a non-linear function.

The method of this invention thus effectively applies the method of Reference A to a non-maximum length PN sequence of order K=k+1 to achieve synchronization to a PN m-sequence of order k with sign ambiguity (i.e. sign inversion(s)). The invention largely retains the advantages of the method of Reference A, in that it can provide reliable synchronization even for negative SNR and after processing only a small part of the full PN sequence.

The invention is particularly useful in communications systems which may require fast synchronization to a PN m-sequence in relatively low SNR conditions, such as direct sequence spread spectrum communications systems, for example for synchronization to the pilot PN sequence in the pilot channel in an IS-95 CDMA terminal.

BRIEF DESCRIPTION OF THE DRAWINGS

The invention will be further understood from the following description with reference to the accompanying drawings, in which.

DETAILED DESCRIPTION

Figure 1:
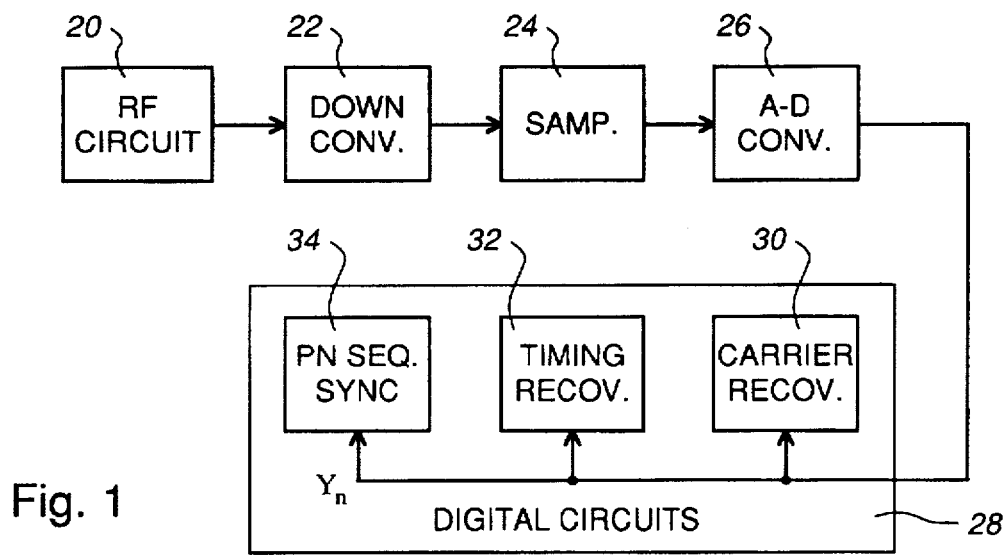
FIG. 1 schematically illustrates a block diagram of part of a wireless digital communications receiver.

The following description presents an algorithm for general channel conditions, followed by simplified algorithms which facilitate practical implementation. An arrangement for implementing an embodiment of the method is then described in detail.

GENERAL CHANNEL CONDITIONS

For extracting symbols $b_i = \pm 1$, counted by an integer i and having a symbol duration $T_0$, of a PN sequence of length M symbols from a received input signal $Y_n$ accompanied by noise represented by a random value sequence $y_n$, where n is an integer identifying each sampling point, a processing state is given by equation (1):

$$Y_n = \Psi\left(\theta \sum_{i=1}^{m} b_i f\left(\frac{n\Delta t + (i-1)T_0 - \tau_n}{T_0}\right), y_n\right) \quad (1)$$

where the received signal is assumed for convenience to have unit amplitude, v represents the sign of the received symbol sequence and has the value $\pm 1$, $\Delta t$ is the sampling interval, $\tau_n$ is a PN sequence delay for the sampling point n and is assumed to be constant for all sampling points, f( ) is a function representing the pulse form which has non-zero values only in the interval (0,1), and $\Psi(.)$ is a function which represents the interaction between the signal and noise.

Assuming that the sampling interval $\Delta t = T_0$ and that noise samples are not correlated for this sampling interval, then equation (1) can be expressed as:

$$Y_n = \Psi\left(\theta \sum_{i=1}^{m} b_i f[n - i + 1 - q], y_n\right) \quad (2)$$

where q is a discrete random variable uniformly distributed in the interval [0,M−1]. Assuming that the symbol timing (i.e. clock) recovery is perfect, the pulse form function f[n−i+1−q] is a delta function which has a value of 1 for n−i+1−q=0 and otherwise has a value of 0. Using the notation:

$$B_n \equiv \sum_{i=1}^{m} b_i f[n - i + 1 - q] \quad (3)$$

gives the results:

$$B_n = b_{n-q+1} \quad (4)$$

$$Y_n = \Psi(vB_n, y_n) \quad (5)$$

Figure 2:
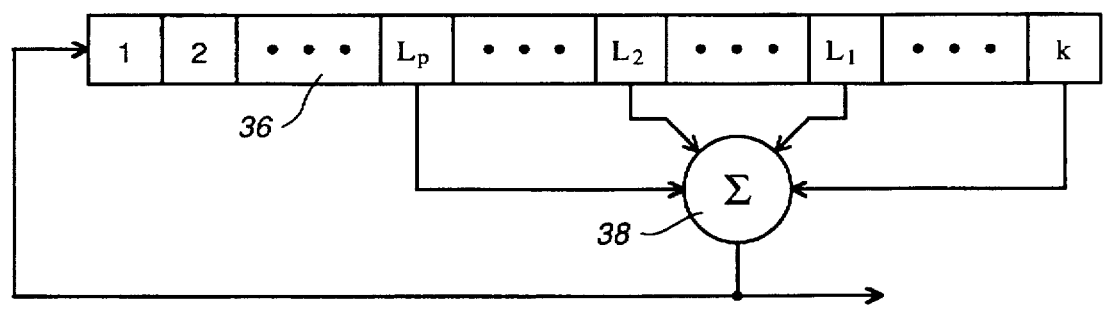
FIG. 2 schematically illustrates a linear feedback shift register for generating a PN sequence.

A linear feedback shift register, having k stages and p taps at stages $L_1, L_2, \ldots L_p$, can be used as illustrated in FIG. 2 and described below to generate a sequence in accordance with a polynomial G(D) of order k given by:

$$G(D) = D^k + \sum_{i=1}^{p} D^{L_i} + 1 \quad (6)$$

where i, p, and k are integers. The n-th symbol of such a sequence is determined by a subsequence comprising the k symbols preceding the n-th symbol, so that:

$$B_n = B_{n-k} B_{n-L_1} B_{n-L_2} \cdots B_{n-L_p} \quad (7)$$

If the polynomial represented by equation (6) is primitive, then the generated sequence is an m-sequence (maximal length sequence) with a length or period of $M = 2^k - 1$ symbols.

Incorporating a new discrete variable $C_n = vB_n$ into equation (7) gives:

$$C_{n-k} C_{n-L_1} C_{n-L_2} \cdots C_{n-L_p} = v^{p+1} B_{n-k} B_{n-L_1} B_{n-L_2} \cdots B_{n-L_p} \quad (8)$$

For an m-sequence the number of intermediate tap outputs p+1 is even, so that $v^{p+1} = 1$ for any m-sequence. Consequently, a common generating equation for both direct and inverse sequences can be expressed in the form:

$$C_n = vC_{n-k} C_{n-L_1} C_{n-L_2} \cdots C_{n-L_p} \quad (9)$$

and the preceding (n−1)-th step can be expressed as:

$$C_{n-1} = vC_{n-k-1} C_{n-L_1-1} C_{n-L_2-1} \cdots C_{n-L_p-1} \quad (10)$$

from which:

$$v = C_{n-1} C_{n-k-1} C_{n-L_1-1} C_{n-L_2-1} \cdots C_{n-L_p-1} \quad (11)$$

Substituting for v from equation (11) into equation (9) gives the recursive equation for symbols in both direct and inverse sequences:

$$C = C_{n-k} C_{n-L_1} C_{n-L_2} \cdots C_{n-L_p} C_{n-1} C_{n-k-1} C_{n-L_1-1} C_{n-L_2-1} \cdots C_{n-L_p-1}$$

from which:

$$C = C_{n-K} C_{n-R_1} C_{n-R_2} \cdots C_{n-R_p} \quad (12)$$

where K=k+1 is the number of stages in the generating shift register for both direct and inverse sequences, the shift register having P intermediate taps at stages $R_1, R_2, \ldots R_p$.

The number P and the intermediate tap locations $R_1, R_2, \ldots R_p$ of the generating shift register for direct and inverse sequences can be easily determined. If the initial sequence is assumed to be generated by a characteristic polynomial of order k with a coefficients vector A given by:

$$A = [1 \ a_1 \ a_2 \ldots a_{k-1} \ 1] \quad (13)$$

where the coefficients $a_i$ (i being an integer from 1 to k−1) are each 1 for the intermediate tap locations $L_1, L_2, \ldots L_p$ and otherwise are 0, then a coefficients vector $A_{in}$ of order K=k+1 for the characteristic polynomial for both direct and inverse sequences can be determined by a vector modulo-2 sum of two coefficients vectors A1 and A2 given by:

$$A1 = [0 \; [1 \; a_1 \; a_2 \ldots a_{k-1} \; 1]]$$

$$A2 = [[1 \; a_1 \; a_2 \ldots a_{k-1} \; 1] \; 0] \tag{14}$$

so that:

$$A_{ln} = [1 \; \bar{a}_1 \; (a_1 \oplus a_2)(a_2 \oplus a_3) \ldots (a_{k-2} \oplus a_{k-1}) \; \bar{a}_{k-1} \; 1] \tag{15}$$

where $\bar{a}_i$ denotes the inverse of $a_i$ and $\oplus$ denotes the modulo-2 sum.

A channel model is then given by equation (12) above and the equation:

$$Y_n = \Psi(C_n, y_n) \tag{16}$$

It can be seen that this model, for the (non maximal-length) linear recursive sequence of equation (15), has the same form as the model defined by equations (5) and (7) of Reference A. Following the reasoning given in Reference A, a recursive algorithm for filtering a discrete PN sequence of symbols having sign ambiguity or inversions is expressed by the following equation derived from equation (13) of Reference A:

$$\hat{C}^n_{n-\tau+1} = \tag{17}$$

$$\begin{cases} \hat{C}^{n-1}_{n-\tau+1} & \tau \neq R_t + 1, \, t = 1, 2, \ldots P \\ & \tau \neq 1 \\ \dfrac{\hat{C}^{n-1}_{n-k} \phi(Y_n) + \Pi^P_{i=1, i \neq t} \hat{C}^{n-1}_{n-R_i} + \hat{C}^{n-1}_{n-R_t}}{1 + \phi(Y_n) \hat{C}^{n-1}_{n-k} \Pi^P_{i=1} \hat{C}^{n-1}_{n-R_i}} & \tau = R_t + 1, \, t = 1, 2, \ldots P \\ \dfrac{\phi(Y_n) + \hat{C}^{n-1}_{n-k} \Pi^P_{i=1} \hat{C}^{n-1}_{n-R_i}}{1 + \phi(Y_n) \hat{C}^{n-1}_{n-k} \Pi^P_{i=1} \hat{C}^{n-1}_{n-R_i}} & \tau = 1 \end{cases}$$

where $\hat{C}^n_{n-\tau}$ denotes the n-th iteration of a recursive non-linear minimum mean-square estimate of the symbol $C_{n-\tau}$, with the initial condition $C^0_{1-\tau}$ with $\tau$ being an integer from 1 to K. Conveniently the initial condition is set to $C^0_{1-\tau} = 0$ for all values of $\tau$.

It can also be shown that, analogously to equation (11) in Reference A, a maximum probability extrapolation estimate $\hat{C}_n$ for the n-th symbol $C_n$ is given by:

$$\hat{C}_n = \mathrm{sgn} \; \hat{C}^{n-1}_{n-k} \, \pi^P_{i=1} \, \mathrm{sgn} \; \hat{C}^{n-1}_{n-R_i} \tag{18}$$

Analogously to Reference A, equation (17) can be simplified using hyperbolic functions and the following notations:

$$\gamma_n = a \tanh \phi(Y_n)$$

$$\hat{U}^{n-1}_{n-i} = a \tanh \hat{C}^{n-1}_{n-i}$$

$$\hat{U}^n_{n-i} = a \tanh \hat{C}^n_{n-i}$$

$$i = 1, 2, \ldots K \tag{19}$$

with the approximation:

$$a \tanh(\tanh x \tanh y) = \mathrm{sgn} \; x \; \mathrm{sgn} \; y \; \min\{|x|, |y|\} \tag{20}$$

to give the following equation (21):

$$\hat{U}^n_{n-\tau+1} = \begin{cases} \hat{U}^{n-1}_{n-\tau+1} & \begin{array}{l} \tau \neq R_t + 1, \\ t = 1, 2, \ldots P \\ \tau \neq 1 \end{array} \\ \hat{U}^{n-1}_{n-R_t} + \mathrm{sgn} \; \hat{U}^{n-1}_{n-k} \; \mathrm{sgn} \; \gamma_n \; \Pi^P_{i+1, i \neq t} \; \mathrm{sgn} \; \hat{U}^{n-1}_{n-R_i} \min \\ \quad \left\{ \begin{array}{l} |\hat{U}^{n-1}_{n-k}|, |\gamma_n|, |\hat{U}^{n-1}_{n-R_1}|, \ldots |\hat{U}^{n-1}_{n-R_{t-1}}|, |\hat{U}^{n-1}_{n-R_{t+1}}|, \\ \ldots |\hat{U}^{n-1}_{n-R_P}| \end{array} \right\} & \begin{array}{l} \tau = R_t + 1, \\ t = 1, 2, \ldots P \end{array} \\ \gamma_n + \mathrm{sgn} \; \hat{U}^{n-1}_{n-k} \; \Pi^P_{i=1} \; \mathrm{sgn} \; \hat{U}^{n-1}_{n-R_i} \min \left\{ \begin{array}{l} |\hat{U}^{n-1}_{n-k}|, |\hat{U}^{n-1}_{n-R_1}|, \\ \ldots |\hat{U}^{n-1}_{n-R_P}| \end{array} \right\} & \tau = 1 \end{cases}$$

with the initial condition $U^0_{1-\tau}$ with $\tau$ being an integer from 1 to K.

For a channel with only additive white Gaussian noise (AWGN), represented by:

$$\gamma_n = \dfrac{Y_n}{\sigma_n^2} \tag{22}$$

equation (21) can be simplified to the form of the following equation (23):

$$\hat{v}_{n-\tau+1}^{n} = \begin{cases} \hat{v}_{n-\tau+1}^{n-1} & \begin{matrix} \tau \neq R_t+1, \\ t=1,2,\ldots P \\ \tau \neq 1 \end{matrix} \\ \hat{v}_{n-R_t}^{n-1} + \text{sgn}\,\hat{v}_{n-k}^{n-1}\,\text{sgn}\,Y_n\,\Pi_{i+1,i\neq t}^{P}\,\text{sgn}\,\hat{v}_{n-R_i}^{n-1}\,\text{min} \begin{Bmatrix} |\hat{v}_{n-k}^{n-1}|,|Y_n|,|\hat{v}_{n-R_1}^{n-1}|,\ldots|\hat{v}_{n-R_{t-1}}^{n-1}|,|\hat{v}_{n-R_{t+1}}^{n-1}|, \\ \ldots |\hat{v}_{n-R_p}^{n-1}| \end{Bmatrix} & \begin{matrix} \tau = R_t+1, \\ t=1,2,\ldots P \end{matrix} \\ Y_n + \text{sgn}\,\hat{v}_{n-k}^{n-1}\,\Pi_{i=1}^{P}\,\text{sgn}\,\hat{v}_{n-R_i}^{n-1}\,\text{min} \begin{Bmatrix} |\hat{v}_{n-k}^{n-1}|,|\hat{v}_{n-R_1}^{n-1}|, \\ \ldots |\hat{v}_{n-R_p}^{n-1}|) \end{Bmatrix} & \tau = 1 \end{cases}$$

with the initial condition $v_{-\tau}^{0}$ with $\tau$ being an integer from 1 to K, where:

$$\hat{v}_{n-K}^{n-1} = \sigma_y^2 \, \theta_{n-K}^{n-1}$$

$$\hat{v}_{n-\tau}^{n} = \sigma_y^2 \, \theta_{n-\tau}^{n} \tag{24}$$

and $\sigma_y^2$ can be unknown.

Physical Implementation

Referring now to the drawings, FIG. 1 illustrates in a block diagram parts of a wireless digital communications receiver, for example for a spread spectrum cellular communications system compatible with the IS-95 standard, in which a wireless digital communications signal is supplied via an RF (radio frequency) circuit 20 of a receiver to a down converter 22 to produce a signal which is sampled by a sampler 24, the samples being converted into digital form by an A-D (analog-to-digital) converter 26 for processing in digital circuits 28 conveniently implemented in a DSP integrated circuit. The digital circuits 28 include a carrier recovery block 30, a timing or clock recovery block 32, and a PN sequence synchronization block 34 in which processing of the digital signals is performed. The PN sequence synchronization block 34 is supplied with the sampled and digitized received symbol sequence from the output of the A-D converter 26, and this constitutes the input signal $Y_n$ of equation (1) above and is the input to the synchronization arrangement described below with reference to FIG. 3.

FIG. 2 illustrates a linear feedback shift register arrangement which can be used to produce a PN sequence for synchronization. The arrangement comprises a shift register 36 having k stages numbered 1 to k, with the outputs of the k-th stage and of intermediate taps along the shift register at the outputs of stages $L_1$, $L_2$, and $L_p$ supplied to inputs of a modulo-2 adder 38. An output of the adder 38 is fed back to the input of the first stage of the shift register and also constitutes a PN sequence output signal in accordance with equation (7) above.

By way of example, it is assumed that the PN sequence to which synchronization is to be established is an m-sequence with order k=10 and the generation polynomial:

$$G_{10}(D) = 1 + \sum_{i=3}^{10} D^i \tag{25}$$

The period or length of the sequence is $2^k-1=1023$ symbols, and the number of intermediate taps of a linear feedback shift register which can be used to generate the sequence is p=7. The coefficients vector for the generating polynomial for this sequence can be seen from equations (13) and (25) to be:

$$A = [1\;0\;0\;1\;1\;1\;1\;1\;1\;1\;1] \tag{26}$$

From equation (14), the coefficients vectors A1 and A2 and their element-by-element modulo-2 sum constituting the coefficients vector $A_{in}$ of the characteristic polynomial of order K=k+1=11 are:

$$A1 = [0\;1\;0\;0\;1\;1\;1\;1\;1\;1\;1]$$

$$A2 = [1\;0\;0\;1\;1\;1\;1\;1\;1\;1\;0]$$

$$A_{in} = [1\;1\;0\;1\;0\;0\;0\;0\;0\;0\;1] \tag{27}$$

from which it can be seen that P=2 and the generating polynomial for both direct and inverse sequences is:

$$A_{in} = 1 + D + D^3 + D^{11} \tag{28}$$

Figure 3:
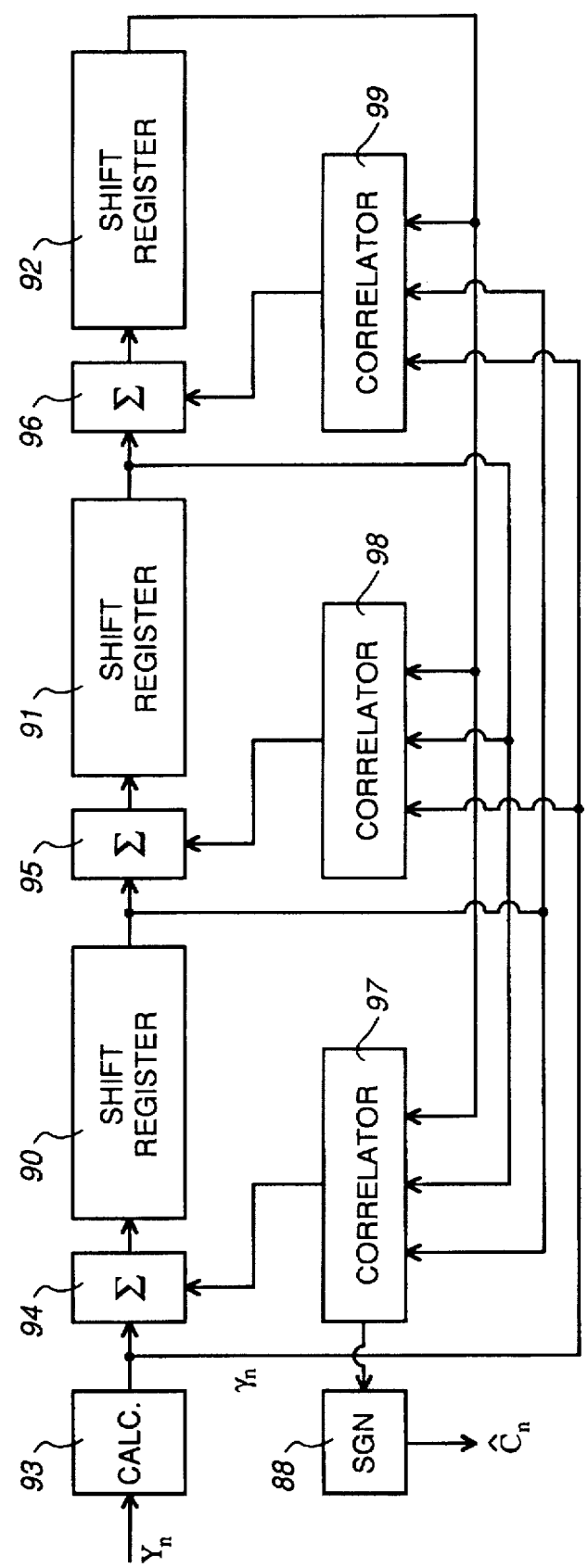
FIG. 3 schematically illustrates a synchronization arrangement for implementing an embodiment of the method of the invention.
Figure 4:
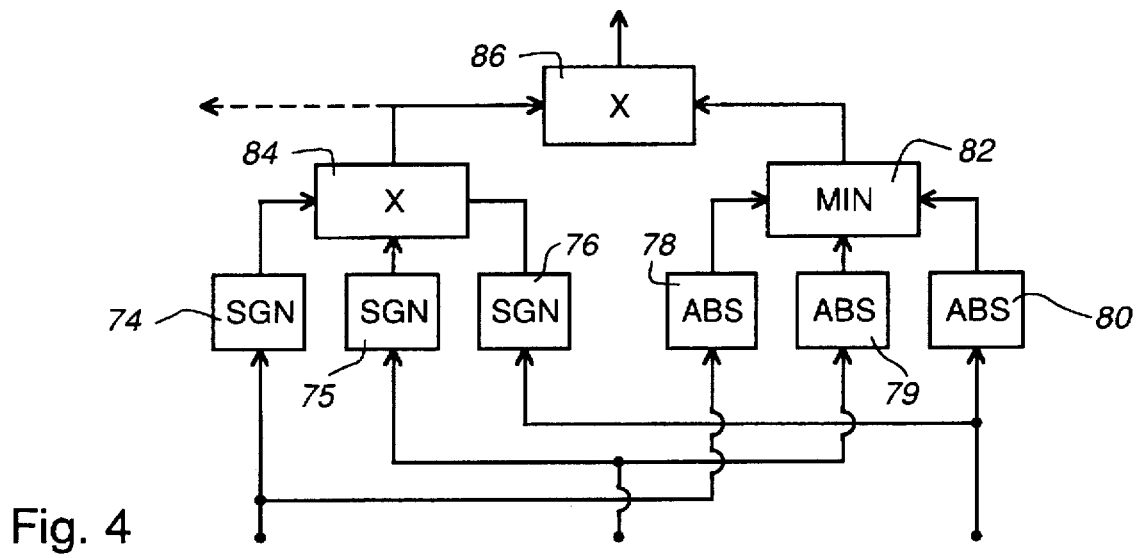
FIG. 4 schematically illustrates in greater detail a correlation block of the synchronization arrangement of FIG. 3.

FIG. 3 illustrates a consequent synchronization arrangement, which includes three correlators and adders as described below for the case of P=2 and serves to implement equation (21). FIG. 4 illustrates the form of each of the correlators.

Referring to FIG. 3, the synchronization arrangement comprises three shift register parts 90 to 92 which, in accordance with the coefficients vector $A_{in}$ of equations (27) and (28), provide outputs at intermediate taps after 1 and 3 stages, and an output after K=11 stages, of the shift register. Inputs of the shift register parts 90 to 92 are supplied with the outputs of adders 94 to 96 respectively. A calculator 93 produces the output signal $\gamma_n$ from the input signal $Y_n$ constituted by the received symbol sequence in accordance with the first line of equation (19). Each of the three correlators 97 to 99 is as described below with reference to FIG. 4 and produces a respective correlation signal by correlating the three signals from said input, intermediate taps, and output other than the signal to which the respective correlation signal is added by the respective one of the adders 94 to 96.

Thus the correlator 97, producing a correlation signal to be added in the adder 94 to the signal $\gamma_n$ derived by the calculator 93 from the input signal $Y_n$, correlates the signals from the output and the two intermediate taps of the shift register. The correlator 98, producing a correlation signal to be added in the adder 95 to the output signal from the first stage of the shift register (part 90), correlates the signal $\gamma_n$ derived from the input signal $Y_n$ and the signals from the output and the third stage (part 91) of the shift register. Similarly the correlator 99, producing a correlation signal to be added in the adder 96 to the output signal from the third stage of the shift register (part 91), correlates the signal $y_n$ derived from the input signal $Y_n$ and the signals from the output and the first stage (part 90) of the shift register.

As illustrated in FIG. 4, each of the correlators 97 to 99 comprises three sign functions (SGN) 74 to 76, which are supplied with the three input signals to the correlator and produce at their outputs sign signals representing the signs of these inputs, three absolute value functions (ABS) 78 to 80, which are supplied with the three input signals to the correlator and produce at their outputs signals representing the absolute values of these inputs, a minimum function (MIN) 82, which produces at its output the minimum value of the absolute values supplied to its inputs from the functions 78 to 80, and two multipliers 84 and 86. The multiplier 84 produces at its output a product of the sign signals supplied to its inputs from the functions 74 to 76, and the multiplier 86 multiplies this output by the minimum value produced by the function 82 to produce the output signal of the correlator. As can be appreciated, all of these functions can be easily implemented within a DSP integrated circuit, without requiring division or multiple digit multiplication operations.

It is also observed that, although for the correlators are described separately, the sign functions 74 to 76 and the absolute value functions 78 to 80 can be used commonly among the correlators; i.e. the three correlators 97 to 99 only require a total of four such sign functions and four such absolute value functions for producing the signs and absolute values of the four signals to be correlated.

It can easily be seen that the synchronization arrangement of FIGS. 3 and 4 operates in accordance with equation (21) above. Initially the shift register contents are zeroed, and the synchronized PN sequence can be obtained from the contents of the shift register parts 90 to 92 when synchronization has been achieved. It can also be seen that this arrangement operates in accordance with the simplified equation (23) for a channel with AWGN simply by replacing the non-linear calculation function 93 by a constant.

FIG. 3 also shows the synchronization arrangement as including an optional further sign function (SGN) 88, which is supplied with an additional output from the correlator 97, this output being taken from the output of the multiplier 84 in the correlator 97 as shown by a broken line in FIG. 4. The output of the function 88 constitutes the symbol estimate $Ĉ_n$ in accordance with equation (18), and thus this is easily provided as a byproduct of the synchronization process.

Figure 5:
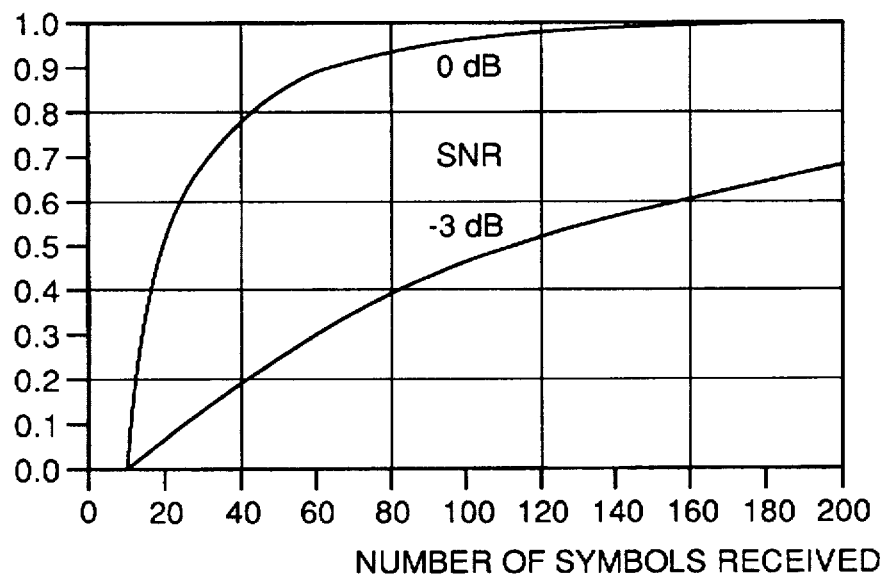
FIG. 5 illustrates performance of the arrangement indicated by simulation results.

FIG. 5 illustrates approximately performance of the synchronization method and arrangement described in the above example as expected from simulation results, showing the probability of synchronization plotted against number of symbols of the sequence received, for SNRs of 0 and −3 dB. In the former case, synchronization is achieved within 200 symbols. In the latter case, the probability of synchronization being achieved within 200 symbols is reduced to about 0.7. As can be appreciated from these results, even with these low SNRs and phase ambiguity, synchronization is achieved within only part of the PN sequence, and the speed of synchronization improves rapidly with increasing SNR.

The synchronization arrangement described above is therefore particularly advantageous in cases where the SNR is low, for example about 0 dB or less. For very low SNR, the arrangement can be used for one stage of a multiple stage system. It is further noted that the arrangement has the advantage that its complexity is largely independent of the PN sequence length, being proportionally dependent upon the length of the PN sequence generating register.

Although particular embodiments of the invention have been described in detail, it should be appreciated that numerous modifications, variations, and adaptations may be made without departing from the scope of the invention as defined in the claims.

What is claimed is:

1. A method of synchronizing to a PN (pseudo random) sequence which can be generated by a linear feedback shift register having k stages and p intermediate taps, where k and p are positive integers and k>p, the PN sequence being a maximal-length sequence comprising $2^k-1$ symbols and having a characteristic polynomial of order k with a coefficients vector A given by:

$$A=[1\ a_1\ a_2\ \ldots\ a_{k-1}\ 1]$$

where the coefficients $a_1$ to $a_{k-1}$ are each 1 for an intermediate tap location and otherwise are 0, the method comprising the steps of:

supplying a received symbol sequence having sign ambiguity to an input of, and shifting the sequence through, a shift register having K=k+1 stages with an intermediate tap at each location defined by a 1, between first and last 1s, in a coefficients vector $A_{in}$ given by:

$$A_{in}=[1\ \bar{a}_1\ (a_1\oplus a_2)\ (a_2\oplus a_3)\ \ldots\ (a_{k-2}\oplus a_{k-1})\ \bar{a}_{k-1}\ 1]$$

where $\bar{a}_1$ and $\bar{a}_{k-1}$ are the inverse of $a_1$ and $a_{k-1}$ respectively and $\oplus$ denotes a modulo-2 sum, whereby the shift register has P intermediate taps where P is a positive integer less than K;

recursively adding a respective correlation signal at the input and at each intermediate tap of the shift register; and producing each correlation signal by correlating P+1 signals from said input, intermediate taps, and output of the shift register other than the signal to which the respective correlation signal is added.

2. A method as claimed in claim 1 wherein the step of producing each correlation signal comprises producing a product of the signs of said P+1 signals and of a minimum absolute value of said P+1 signals.

3. A method as claimed in claim 2 wherein the step of supplying the received symbol sequence to the input of the shift register comprises the step of modifying the received symbol sequence in accordance with a non-linear function.

4. A method as claimed in claim 1 wherein the step of supplying the received symbol sequence to the input of the shift register comprises the step of modifying the received symbol sequence in accordance with a non-linear function.

5. A method as claimed in claim 1 wherein P=2.

6. A method as claimed in claim 2 wherein P=2.

7. A method as claimed in claim 3 wherein P=2.

8. A method of synchronizing a received symbol sequence having sign ambiguity to a PN (pseudo random) sequence which can be generated by a linear feedback shift register having k stages and p intermediate taps, where k and p are positive integers and k>p, the PN sequence being a maximal-length sequence comprising $2^{k-1}$ symbols and having a characteristic polynomial of order k with a coefficients vector A given by:

$$A=[1\ a_1\ a_2\ \ldots\ a_{k-1}\ 1\ ]$$

where the coefficients $a_1$ to $a_{k-1}$ are each 1 for an intermediate tap location and otherwise are 0, the method comprising the steps of:

shifting the received symbol sequence through a shift register having K=k+1 stages with an intermediate tap at each location defined by a 1, between first and last 1s, in a coefficients vector $A_{in}$ given by:

$$A_{in}=[1\ \bar{a}_1\ (a_1 \oplus a_2)\ (a_2 \oplus a_3)\ \ldots\ (a_{k-2} \oplus a_{k-1})\ \bar{a}_{k-1}\ 1]$$

where $\bar{a}_1$ and $\bar{a}_{k-1}$ are the inverse of $a_1$ and $a_{k-1}$ respectively and $\oplus$ denotes a modulo-2 sum, whereby the shift register has P intermediate taps where P is a positive integer less than K;

at the input and at each intermediate tap of the shift register, recursively adding to the shift register contents a respective correlation signal;

producing the correlation signal for adding at the input of the shift register by correlating P+1 signals from the P intermediate taps and the output of the shift register; and producing the correlation signal for adding at each of the P intermediate taps by correlating P+1 signals from the input, output, and P−1 other intermediate taps of the shift register.

9. A method as claimed in claim 8 wherein the step of producing each correlation signal comprises producing a product of the signs and of a minimum absolute value of the P+1 signals being correlated.

10. A method as claimed in claim 9 and including the step of supplying the received symbol sequence to the input of the shift register via a non-linear function.

11. A method as claimed in claim 8 and including the step of supplying the received symbol sequence to the input of the shift register via a non-linear function.

12. A method as claimed in claim 8 wherein P=2.

13. A method as claimed in claim 9 wherein P=2.

14. A method as claimed in claim 10 wherein P=2.

* * * * *